US008416366B2

(12) United States Patent
Chang et al.

(10) Patent No.: US 8,416,366 B2
(45) Date of Patent: Apr. 9, 2013

(54) BACK LIGHT MODULE AND LIQUID CRYSTAL DISPLAY

(75) Inventors: Hsin-Wen Chang, Miao-Li County (TW); Chi-Liang Chang, Miao-Li County (TW); Yung-Kun Chen, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 232 days.

(21) Appl. No.: 13/035,025

(22) Filed: Feb. 25, 2011

(65) Prior Publication Data

US 2012/0019742 A1 Jan. 26, 2012

(30) Foreign Application Priority Data

Jul. 23, 2010 (TW) ................................ 99124497 A

(51) Int. Cl.
*G02F 1/1335* (2006.01)
*G01D 11/28* (2006.01)
*F21V 7/04* (2006.01)

(52) U.S. Cl. ................ 349/65; 349/61; 362/26; 362/612

(58) Field of Classification Search .................... 349/65, 349/61; 362/26, 612
See application file for complete search history.

(56) References Cited

U.S. PATENT DOCUMENTS

| 6,997,582 | B2* | 2/2006 | Yang et al. | 362/373 |
| 7,465,084 | B2* | 12/2008 | Kawashima et al. | 362/626 |
| 7,901,124 | B2* | 3/2011 | Gomi et al. | 362/616 |
| 2005/0117370 | A1* | 6/2005 | Kawashima et al. | 362/615 |

* cited by examiner

*Primary Examiner* — Mike Qi
(74) *Attorney, Agent, or Firm* — Trop Pruner & Hu, P.C.

(57) ABSTRACT

A liquid crystal display (LCD) and a back light module are provided. The back light module includes a light guide plate (LGP) and a plurality of light-emitting devices. The LGP has a plurality of partitioning grooves, a bottom surface, a light exiting surface, a first side and a second side. The bottom surface is opposite to the light exiting surface. The first side and the second side are located at the two opposite side surfaces of the LGP. The extension direction of each of the partitioning grooves extends from the first side towards the second side. Each of the partitioning grooves has an opening and the opening is located at the bottom surface. The plurality of light-emitting devices are disposed at least one of the first side and the second side. The liquid crystal panel of the LCD is disposed at the light exiting surface.

20 Claims, 4 Drawing Sheets

BACK LIGHT MODULE AND LIQUID CRYSTAL DISPLAY

CROSS-REFERENCE TO RELATED APPLICATION

This application claims the priority benefit of Taiwan application serial no. 99124497, filed on Jul. 23, 2010. The entirety of the above-mentioned patent application is hereby incorporated by reference herein and made a part of this specification.

BACKGROUND OF THE INVENTION

1. Field of the Invention

The invention generally relates to a back light module and a display apparatus, and more particularly, to a edge-type back light module and a liquid crystal display (LCD).

2. Description of Related Art

The LCD has played a major role in the mainstream display apparatus market in recent years due to advantages of low voltage operation, no radiation, light and compact design. An LCD mainly includes a liquid crystal panel and a back light module, wherein the back light module is for providing a planar light source required by the liquid crystal panel so as to make the LCD displaying. The LCD controls the rotations of the liquid crystal molecules in the liquid crystal panel so as to determine the light flux for producing gray level variations and thereby constituting a static or dynamic image.

When human-eyes watch dynamic images played on an LCD, every digital frame would stay for a while and then to be updated to the next frame. Therefore, in successive frames of digital images, a moving object is not displayed in continuous moving way, but in step moving way. When human-eyes are watching a moving object, the positions of the object moving would be traced by the human-eyes. In particular, during switching the frames of the LCD, the back light module still keep providing the light. As a result, the human-eyes easily have noticed that the object moves not continuously during switching the frames (i.e., during the rotations of the liquid crystal molecules). Since the positions of the images of a same moving object come from the successive frames staying on the retinas are different, the double image phenomena are presented, which leads to blurry image profiles and further gives the display quality of the LCD a negative impact.

In order to solve the above-mentioned problem, a scan-type back light module was provided, where a regional lighting method is adopted so as to reduce the chance for human-eyes to see frame switching blur. In a direct-type back light module, the light-emitting devices of each region are turned on alternately one after another so as to more easily achieve the objective of regional lighting. However, the direct-type back light module has a disadvantage of larger overall thickness. A edge-type back light module, in order to achieve the same objective of regional lighting, employs a plurality of light-emitting devices respectively arranged in each region and adopts the regional lighting method. At each region, a corresponding independent sub-light-guide-plate (sub-LGP) is disposed, and all the sub-LGPs are assembled together. Although the edge-type back light module is advantageous in smaller overall thickness, but the plurality of sub-LGPs are not easy to be well aligned, which is resulted in poor optical quality. In addition, with a edge-type back light module, since each independent sub-LGP has a manufacturing tolerance, the length, the width and the thickness thereof have inconsistency from each other, hence after assembling, the optical quality of each region is uneven from the other regions, and bright lines likely appear at the seams between the independent sub-LGPs.

SUMMARY OF THE INVENTION

Accordingly, the invention is directed to a back light module able to solve the problem that when a plurality of sub-LGPs of the back light module are assembled, the sub-LGPs are not easily aligned.

The invention is also directed to an LCD able to solve the disadvantage that when a plurality of sub-LGPs of the back light module of the LCD are assembled, the optical quality thereof is poor.

The back light module of the invention includes an LGP and a plurality of light-emitting devices. The LGP has a plurality of partitioning grooves, a bottom surface, a light exiting surface, a first side and a second side. The bottom surface is opposite to the light exiting surface. The first side and the second side are located at the two opposite side surfaces of the LGP. The extension direction of each of the partitioning grooves extends from the first side towards the second side. Each of the partitioning grooves has an opening and the opening is located at the bottom surface. The plurality of light-emitting devices are disposed at the first side.

The LCD of the invention includes the above-mentioned back light module and a liquid crystal panel disposed at the light exiting surface of the LGP.

In an embodiment of the invention, the depth of each of the partitioning grooves is constant along the extension direction of each the partitioning groove.

In an embodiment of the invention, the depth of each of the partitioning grooves is greater than or equal to the half of the thickness of the LGP.

In an embodiment of the invention, the depths at both end portions of each of the partitioning grooves are less than the depth at the center portions. In addition, the depth at the center portions of each of the partitioning grooves is, for example, equal to the thickness of the LGP.

In an embodiment of the invention, the width of the opening of each of the partitioning grooves is less than or equal to 1 mm.

In an embodiment of the invention, the back light module further includes a plurality of control loops, wherein the light-emitting devices corresponding to different regions partitioned by the partitioning grooves are controlled by different control loops.

In an embodiment of the invention, the back light module further includes a plurality of control loops, wherein the light-emitting devices corresponding to one region located between every two adjacent ones of the partitioning grooves are controlled by a same one of the control loops.

In an embodiment of the invention, the back light module further includes a plurality of sub partitioning grooves, wherein at least one of the sub partitioning groove is disposed between two adjacent ones of the partitioning grooves.

In an embodiment of the invention, the back light module further includes a plurality of reflectors disposed in the partitioning grooves.

Based on the depiction above, in the back light module and the LCD, the LGP has a plurality of partitioning grooves so as to provide a light source per region and save the alignment step during the assembling for advancing the optical quality.

In order to make the aforementioned and other features and advantages of the invention comprehensible, several exemplary embodiments accompanied with figures are described in detail below.

DESCRIPTION OF THE EMBODIMENTS

Figure 1:
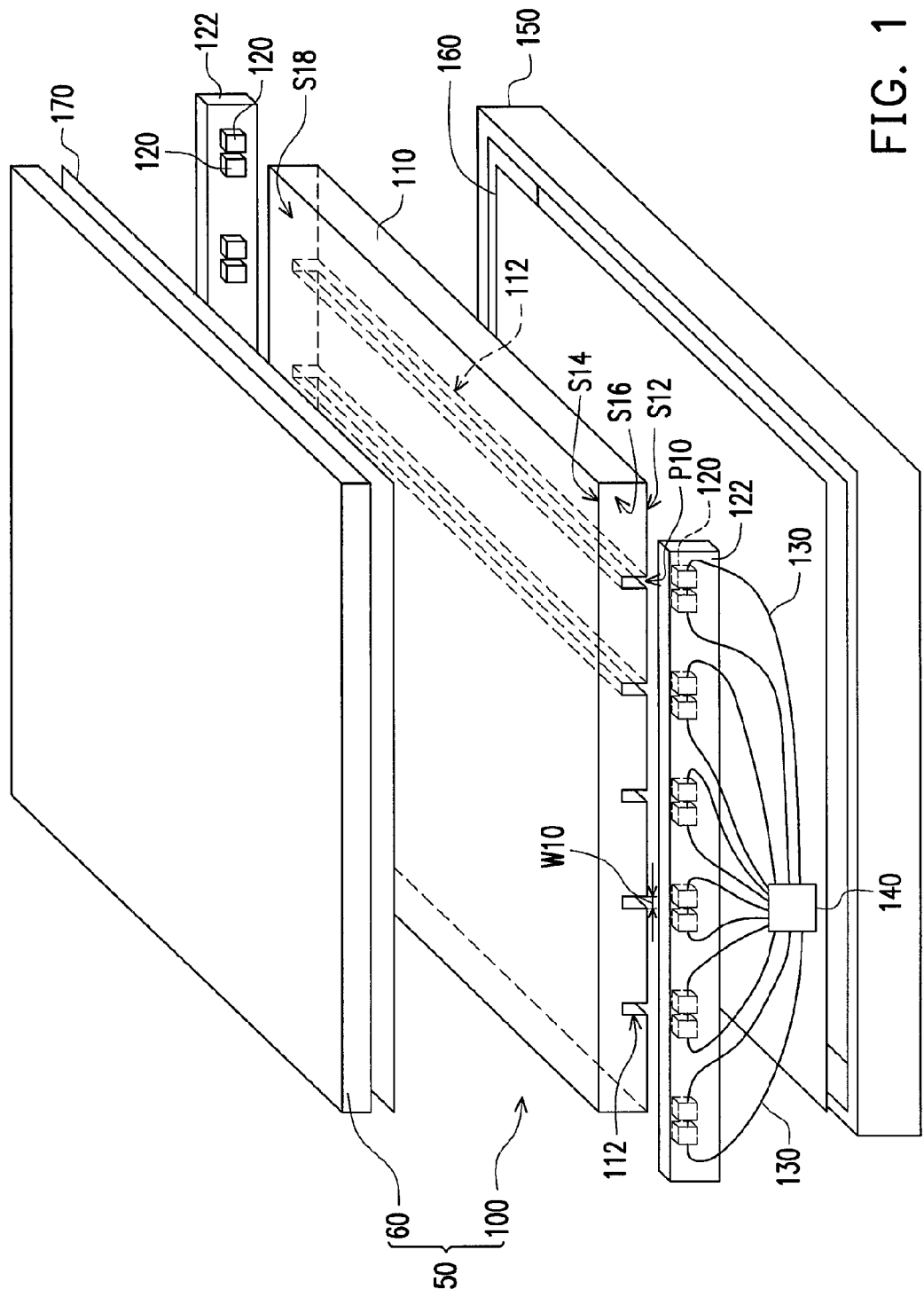
FIG. 1 is an exploded view diagram of an LCD and a back light module according to an embodiment of the invention.

Reference will now be made in detail to the preferred embodiments of the invention, examples of which are illustrated in the accompanying drawings. Wherever possible, the same reference numbers are used in the drawings and the description to refer to the same or like parts.

Figure 2:
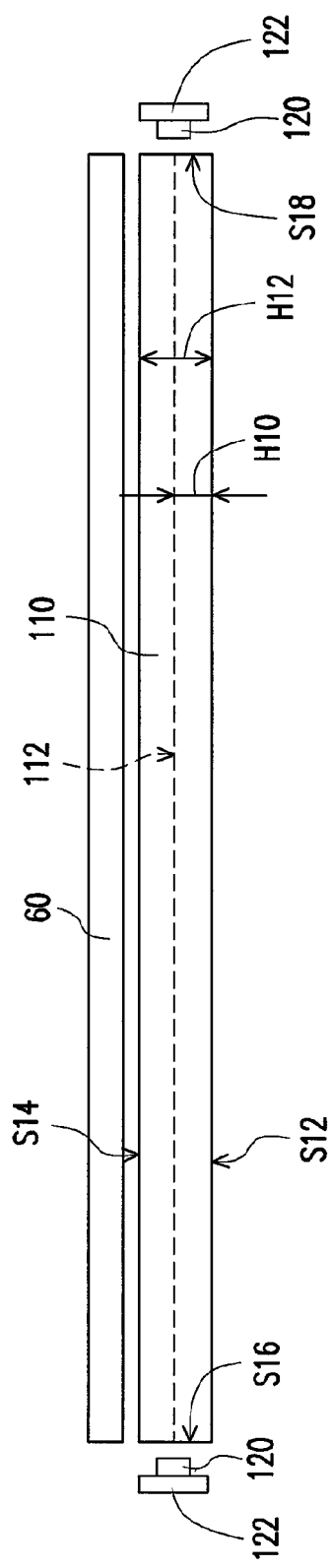
FIG. 2 is a side view diagram of the back light module of FIG. 1.

FIG. 1 is an exploded view diagram of an LCD and a back light module according to an embodiment of the invention and FIG. 2 is a side view diagram of the back light module of FIG. 1. Referring to FIG. 1, an LCD 50 of the embodiment includes a liquid crystal panel 60 and a back light module 100. The back light module 100 of the embodiment includes a back plate 150, a reflective sheet 160, an LGP 110, a plurality of light-emitting devices 120 and an optical film 170. The LGP 110 has a plurality of partitioning grooves 112, a bottom surface S12, a light exiting surface S14, a first side S16 and a second side S18. The bottom surface S12 is opposite to the light exiting surface S14, i.e., the two surfaces are respectively a lower surface and an upper surface of the LGP 110. The first side S16 and the second side S18 are located at the opposite side surfaces of the LGP 110, and the first side S16 is not adjacent to the second side S18. The extension direction of each of the partitioning grooves 112 extends from the first side S16 towards the second side S18. An opening P10 of each the partitioning groove 112 is located at the bottom surface S12. The light-emitting devices 120 are disposed at the first side S16 and the second side S18 of the LGP 110.

The LGP 110 of the embodiment is partitioned into a plurality of regions by the partitioning grooves 112. When the light-emitting devices 120 corresponding to each region are turned on, the light, restricted by the corresponding partitioning groove 112, exits roughly only from a light exiting surface S14 corresponding to a single region. In this way, the objective of separately providing a light source is achieved, which further improve the display quality of the LCD 50 during displaying dynamic images. Meanwhile, the LGP 110 is still a single device, and assembling and aligning are needless for the LGP 110, so that the problem in the prior art, which an LGP is cut off to become a plurality of independent sub-LGPs and the sub-LGPs need to be aligned during assembling. Moreover, the scheme of the embodiment can avoid the inconsistency of the dimension tolerances between the independent sub-LGPs, which is helpful to advance the optical quality of the back light module 100 of the embodiment. In addition, the back light module 100 of the embodiment adopts a edge-type back light module design, which is advantageous not only in smaller overall thickness, but also in saving the lighting up time, the luminance and/or the quantity of the light-emitting devices 120 so as to achieve the objective of saving energy.

The partitioning grooves 112 of the embodiment are, for example, in band-resembling shape, wherein the partitioning grooves 112 are parallel to each other. In FIG. 1, the shapes of only two of the partitioning grooves 112 are shown by dotted lines. FIG. 2 is a side view diagram showing the LGP 110 and the light-emitting devices 120 in the embodiment. The depth H10 of each of the partitioning grooves 112 of the embodiment is constant, i.e., the depth H10 of each of the partitioning grooves 112 is constant from an end close to the first side S16 to another end close to the second side S18. The depth H10 of each of the partitioning grooves 112 is greater than or equal to the half of the thickness H12 of the LGP 110, but less than the thickness H12 of the LGP 110, wherein the thickness H12 of the LGP 110 means the thickness at the most area of the LGP 110; however, there might be other detailed structures at the peripheral area of the LGP 110 and the thickness of the unshown detailed structure is not included by the above-mentioned thickness H12 of the LGP 110. In FIG. 1, the width W10 of the opening P10 of each of the partitioning grooves 112 of the embodiment is less than or equal to 1 mm, which the invention is not limited to. Besides, the width of the bottom of the partitioning groove 112 can be equal to or unequal to the width W10 of the opening P10 of the partitioning groove 112. That is to say, the shape of the partitioning groove 112 viewed from the first side S16 can be rectangle, trapezoid, triangle or other shapes. The length of the partitioning groove 112 along the extension direction thereof can be less than or equal to the distance between the first side S16 and the second side S18. In the figures of the embodiment, the shown length of the partitioning groove 112 along the extension direction thereof is, for exemplary depiction, equal to the distance between the first side S16 and the second side S18. The distance between the adjacent partitioning grooves 112 in the embodiment is constant, which the invention is not limited to.

In the embodiment, the light-emitting devices 120 are, for example, light emitting diodes (LEDs), which the invention is not limited to. The light-emitting devices 120 of the embodiment are disposed on a circuit board 122, wherein the circuit board 122 can be a flexible design or a hard design. The light-emitting devices 120 are disposed beside both the first side S16 and the second side S18 of the LGP 110 of the embodiment, but it is allowed the light-emitting devices 120 are disposed only at the first side S16 of the LGP 110. The back light module 100 of the embodiment further includes a plurality of control loops 130. The control loops 130 shown in FIG. 1 are schematic, not the representation of real shape of the control loops 130. The light-emitting devices 120 corresponding to one of the regions partitioned by the partitioning grooves 112 are controlled by a same control loop 130. The light-emitting devices 120 corresponding to the different regions are controlled by different control loops 130, and the light-emitting devices 120 controlled by different control loops 130 can be turned on or off at different time so as to achieve the objective of providing a regional light source. In addition, the control loops 130 can be controlled by a single control chip 140, but in other embodiments, the control loops 130 can be controlled by a plurality of control chips. The light-emitting devices 120 controlled by a same control loop 130 can have connection in parallel, connection in series or mixed connection by design.

A reflective sheet 160 is disposed on the bottom surface S12 of the LGP 110. A printed or formed structure to destroy total internal reflection (TIR) of light can be also disposed on the bottom surface S12 of the LGP 110. In addition, an optical film 170 can be disposed between the LGP 110 and the liquid crystal panel, and the optical film 170 can be diffusion sheet, brightness-enhancing sheet, etc.

Figure 3:
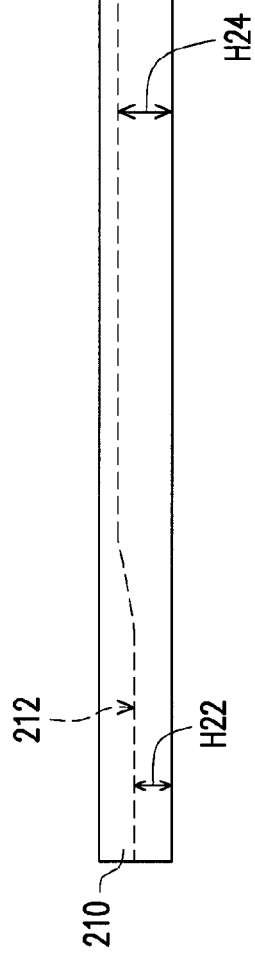
FIGS. 3 and 4 are side view diagrams of two back light modules of the other two embodiments.
Figure 4:
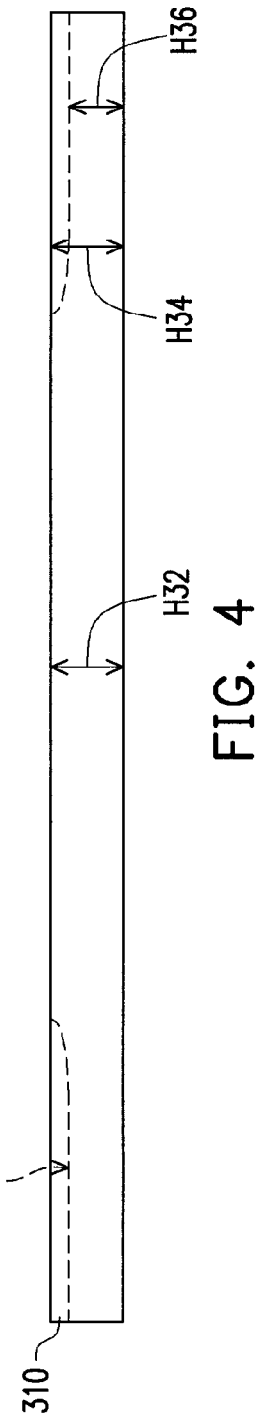

FIGS. 3 and 4 are side view diagrams of two back light modules of the other two embodiments. Referring to FIG. 3, the LGP 210 of the back light module of the embodiment is similar to the LGP 110 of FIG. 2, except that the depths H22 at both end portions of the partitioning groove 212 of the LGP 210 are less than the depth H24 at the center portions. In FIG. 3, the depth H24 at the center portion of the partitioning groove 212 is larger so as to reduce the chance for the light to be leaked from the middle section of the partitioning groove 212 to the adjacent regions. The depth of the partitioning groove 212 is linearly changed from the depth H22 to the depth H24. Referring to FIG. 4, the LGP 310 of the back light module of the embodiment is similar to the LGP 210 of FIG. 3, except that the depth H32 at the center portion of the partitioning groove 312 of the LGP 310 is equal to the depth H34 of the LGP 310, i.e., at the center portion of the partitioning groove 312, both the upper surface and the lower surface of the LGP 310 are penetrated. In the embodiment, in order to avoid the LGP 310 from fracture along the partitioning grooves 312, the depths H36 at both end portions of the partitioning grooves 312 are less than the depth H34 of the LGP 310, and the lengths of the two sections with the depth H36 of each the partitioning groove 312 must be respectively greater than 1/12 of total length of the partitioning groove 312. It is preferred the lengths of the two sections with the depth H36 of each the partitioning groove 312 are respectively greater than 1/10 of total length of the partitioning groove 312. Besides, the depth of the partitioning groove 312 is nonlinearly changed from the depth H32 at the center portions to the depths H36 at both end portions thereof.

Figure 5:
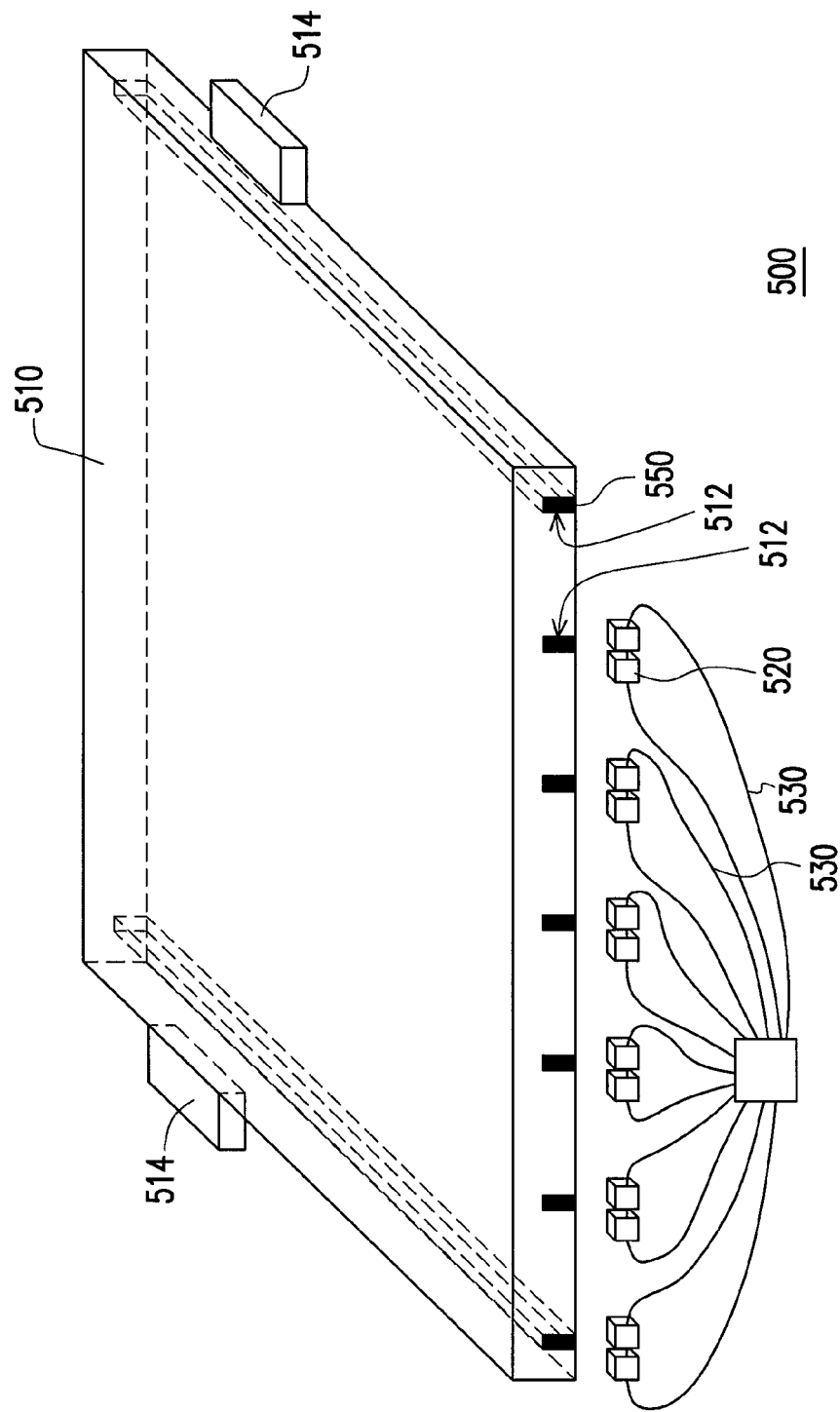
FIG. 5 is a diagram of a back light module according to another embodiment of the invention.

FIG. 5 is a diagram of a back light module according to another embodiment of the invention. Referring to FIG. 5, the back light module 500 of the embodiment is similar to the back light module 100 of FIG. 1. The difference of the back light module 500 from the back light module 100 rests in that there is a positioning structure 514 or other structure able to affect the distribution uniformity of luminance respectively disposed at both sides of the LGP 510 of the embodiment. All of the light-emitting devices 520 are located between two extension lines of the two outer-most partitioning grooves 512. That is to say there is no corresponding light-emitting device disposed at the area beyond the two outer-most partitioning grooves 512, so that the two outer-most partitioning grooves 512 can avoid the distribution uniformity of luminance affected by the positioning structures 514. In the embodiment, the distance between any two adjacent partitioning grooves 512 is the same.

The back light module 500 of the embodiment further includes a plurality of reflectors 550 disposed in the partitioning grooves 512. The reflectors 550 can be sheet-shape element of reflection material or reflection material coated on the groove walls of the partitioning grooves 512 or others with appropriate designs.

Figure 6:
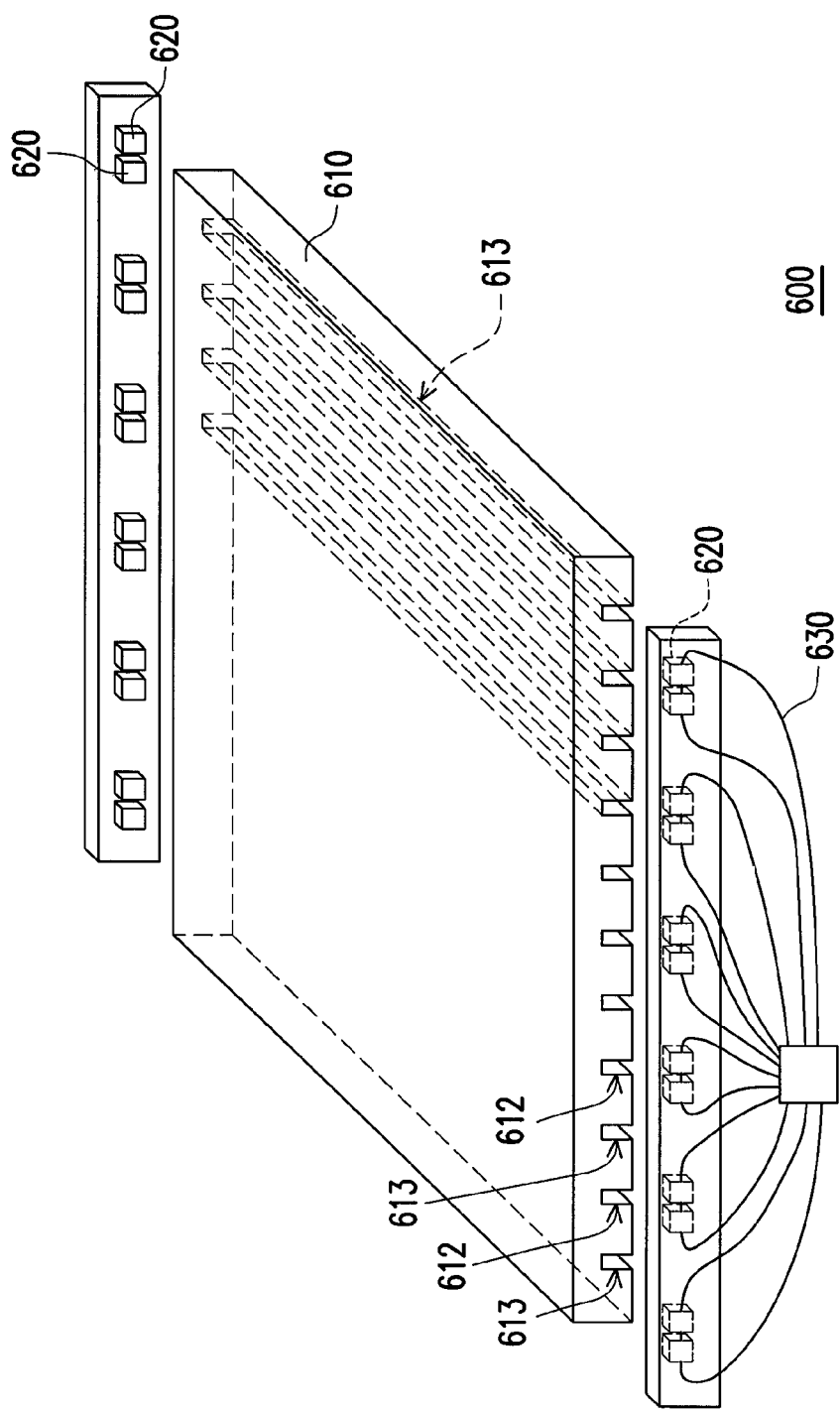
FIG. 6 is a diagram of a back light module according to yet another embodiment of the invention.

FIG. 6 is a diagram of a back light module according to yet another embodiment of the invention. Referring to FIG. 6, the back light module 600 of the embodiment is similar to the back light module 100 of FIG. 1. The difference of the back light module 600 from the back light module 100 rests in that in the embodiment of FIG. 1, the plurality of partitioning grooves 112 partition the LGP 110 into a plurality of regions and each region is corresponding to the light-emitting devices 120 controlled by a control loop 130. In the embodiment of FIG. 6, the LGP 610 has a plurality of partitioning grooves 612 and a plurality of sub partitioning grooves 613. The partitioning grooves 612 partition the LGP 610 into a plurality or regions, and each region is corresponding to the light-emitting devices 620 controlled by a control loop 160. The sub partitioning grooves 613 are disposed between the partitioning grooves 612, and the extension direction of the sub partitioning grooves 613 is roughly parallel to the partitioning grooves 612. The shape and the dimension of the sub partitioning groove 613 can have the same design as the partitioning groove 612 or a different design in association to the partitioning groove 612. The function of the sub partitioning grooves 613 is to enhance blocking the light emitted from the light-emitting devices 620 of the corresponding region from leaking into the adjacent regions. In the embodiment, one sub partitioning groove is disposed respectively between two adjacent partitioning grooves 612, which the invention is not limited to.

In summary, in the back light module and the LCD of the invention, the LGP has a plurality of partitioning grooves so as to separately provide a light source and save the alignment step during the assembling for advancing the optical quality. Meanwhile, the invention can avoid each independent LGP from uneven optical quality between the regions caused by the manufacturing tolerance thereof and avoid the frame from having bright lines at the seams between the independent LGPs.

It will be apparent to those skilled in the art that the descriptions above are several preferred embodiments of the invention only, which does not limit the implementing range of the invention. Various modifications and variations can be made to the structure of the invention without departing from the scope or spirit of the invention.

What is claimed is:

1. A back light module, comprising:
    a light guide plate, having a plurality of partitioning grooves, a bottom surface, a first side and a second side, wherein the first side and the second side are located at the two opposite side surfaces of the light guide plate, the partitioning grooves extends from the first side towards the second side, each of the partitioning grooves has an opening located at the bottom surface; and
    a plurality of light-emitting devices, disposed at the first side.

2. The back light module as claimed in claim 1, wherein the depth of each of the partitioning grooves is constant along the extension direction of each the partitioning groove.

3. The back light module as claimed in claim 1, wherein the depth of each of the partitioning grooves is greater than or equal to the half of the thickness of the light guide plate.

4. The back light module as claimed in claim 1, wherein the depths at both end portions of each of the partitioning grooves are less than the depth at the center portions.

5. The back light module as claimed in claim 4, wherein the depth at the center portions of each of the partitioning grooves is equal to the thickness of the light guide plate.

6. The back light module as claimed in claim 1, wherein the width of the opening of each of the partitioning grooves is less than or equal to 1 mm.

7. The back light module as claimed in claim 1, further comprising a plurality of control loops, wherein the light-emitting devices corresponding to different regions partitioned by the partitioning grooves are controlled by different control loops.

8. The back light module as claimed in claim 1, further comprising a plurality of control loops, wherein the light-emitting devices corresponding to one region located between every two adjacent ones of the partitioning grooves are controlled by a same one of the control loops.

9. The back light module as claimed in claim 8, further comprising a plurality of sub partitioning grooves, wherein at least one of the sub partitioning grooves is disposed between two adjacent ones of the partitioning grooves.

10. The back light module as claimed in claim 1, further comprising a plurality of reflectors disposed in the partitioning grooves.

11. A liquid crystal display, comprising:
- a liquid crystal panel;
- a back light module, comprising:
    - a light guide plate, having a plurality of partitioning grooves, a bottom surface, a light exiting surface, a first side and a second side, wherein the first side and the second side are located at the two opposite side surfaces of the light guide plate, the partitioning grooves extends from the first side towards the second side, each of the partitioning grooves has an opening located at the bottom surface, and the liquid crystal panel is disposed on the light exiting surface; and
    - a plurality of light-emitting devices, disposed at the first side.

12. The liquid crystal display as claimed in claim 11, wherein the depth of each of the partitioning grooves is constant along the extension direction of each the partitioning groove.

13. The liquid crystal display as claimed in claim 11, wherein the depth of each of the partitioning grooves is greater than or equal to the half of the thickness of the light guide plate.

14. The liquid crystal display as claimed in claim 11, wherein the depths at both end portions of each of the partitioning grooves are less than the depth at the center portion.

15. The liquid crystal display as claimed in claim 14, wherein the depth at the center portion of each of the partitioning grooves is equal to the thickness of the light guide plate.

16. The liquid crystal display as claimed in claim 11, wherein the width of the opening of each of the partitioning grooves is less than or equal to 1 mm.

17. The liquid crystal display as claimed in claim 11, further comprising a plurality of control loops, wherein the light-emitting devices corresponding to different regions partitioned by the partitioning grooves are controlled by different control loops.

18. The liquid crystal display as claimed in claim 11, wherein the back light module further comprises a plurality of control loops, wherein the light-emitting devices corresponding to one region located between every two adjacent ones of the partitioning grooves are controlled by a same one of the control loops.

19. The liquid crystal display as claimed in claim 18, wherein the back light module further comprises a plurality of sub partitioning grooves, wherein at least one of the sub partitioning grooves is disposed between two adjacent ones of the partitioning grooves.

20. The liquid crystal display as claimed in claim 11, wherein the back light module further comprises a plurality of reflectors disposed in the partitioning grooves.

* * * * *